United States Patent [19]

Fitzgerald et al.

[11] Patent Number: 5,248,339
[45] Date of Patent: Sep. 28, 1993

[54] FUSING MEMBER COMPRISING FLUORINE-CONTAINING ELASTOMERS USEFUL IN ELECTROSTATOGRAPHY

[75] Inventors: John J. Fitzgerald, Webster; Paul L. Nielsen, Lima; Wayne T. Ferrar, Fairport, all of N.Y.

[73] Assignee: Eastman Kodak Company, Rochester, N.Y.

[21] Appl. No.: 874,264

[22] Filed: Apr. 24, 1992

Related U.S. Application Data

[63] Continuation-in-part of Ser. No. 513,531, Apr. 23, 1990, abandoned.

[51] Int. Cl.$^5$ .................................................. B05C 1/02
[52] U.S. Cl. ............................. 118/60; 118/248; 118/258; 118/101; 118/116; 355/285; 355/293
[58] Field of Search ............... 118/60, 248, 249, 258, 118/101, 116, 110; 29/132; 355/285, 293

[56] References Cited

U.S. PATENT DOCUMENTS

| | | |
|---|---|---|
| 3,515,688 | 6/1970 | Rose . |
| 3,702,833 | 11/1972 | Rose et al. . |
| 3,888,799 | 6/1975 | Rose et al. ............... 528/399 X |
| 3,970,533 | 7/1976 | Kyker et al. . |
| 4,199,626 | 4/1980 | Stryjewski et al. ........... 427/444 |
| 4,264,181 | 4/1981 | Lentz et al. ............... 29/132 X |
| 4,272,179 | 6/1981 | Seanor ................... 29/132 X |
| 4,430,406 | 2/1984 | Newkirk et al. ........... 29/132 X |
| 4,734,471 | 3/1988 | Chang ................. 525/326.4 X |
| 5,014,408 | 5/1992 | Kato et al. ............... 29/132 X |

OTHER PUBLICATIONS

F. Björk and B. Stenberg, "Comparison of Mechanical and Thermal Properties of Phosphonitrilic Fluoroelastomer and Fluorosilicone Rubber", *Plastics and Rubber Processing and Applications*, vol. 9, No. 4, 1988, pp. 227-232.

G. J. Knight and W. W. Wright, "Thermal Stability of Some Heat-Resistant Elastomers", British Polymer Journal 21, (1989), pp. 199-204.

*Primary Examiner*—W. Gary Jones
*Assistant Examiner*—Todd J. Burns
*Attorney, Agent, or Firm*—Nixon, Hargrave, Devans & Doyle

[57] ABSTRACT

An electrostatographic toner fusing member having a support and a layer containing a crosslinked polyfluorophosphazene elastomer with thermally conductive filler particles. This fusing member is used in a device for fusing electrostatographic toner materials to a substrate which device employs both heat and pressure The fusing member exhibits an excellent combination of properties, including resistance to swelling by release liquids, resistance to thermal degradation and thermal conductivity that is superior to prior art fusing members employing crosslinked fluoroelastomers.

10 Claims, No Drawings

FUSING MEMBER COMPRISING FLUORINE-CONTAINING ELASTOMERS USEFUL IN ELECTROSTATOGRAPHY

RELATED APPLICATIONS

This application is a continuation-in-part of U.S. patent application Ser. No. 513,531, filed Apr. 23, 1990 now abandoned.

FIELD OF THE INVENTION

This invention relates to a fusing member that is useful in electrostatography. In one aspect, the invention concerns a fusing member having a layer comprising crosslinked polyfluorophosphazene elastomer and a device for fusing electrostatographic toner images to a substrate, which device includes the aforementioned fusing member as a component.

BACKGROUND

In certain electrostatographic imaging and recording processes such as electrophotographic copying processes, an electrostatic latent image formed on a photoconductive surface is developed with a thermoplastic toner powder which is thereafter fused to a substrate. The fusion step commonly involves directly contacting the substrate, such as a sheet of paper on which toner powder is distributed in an imagewise pattern, with a fusing member such as a heated roll. In most instances as the powder image is tackified by heat, part of the image carried by the sheet sticks to the surface of the roll so that as the next sheet is advanced, the tackified image partially removed from the first sheet partly transfers to the next sheet and at the same time part of the tackified image from the next sheet adheres to the heated roll. Any toner remaining adhered to the heated surface can cause a false offset image to appear on the next sheet that contacts the fusing roll and can also degrade the fusing performance of the fusing surface.

To prevent toner offset, many expedients have been tried such as providing the fusing roll with an adhesive surface such as a thin layer of an elastomer, e.g., a silicone polymer of low surface energy. Also, polymeric release liquids, e.g., polydiorganosiloxane release oils such as polydimethylsiloxane release oils have been applied to the fusing roll surface, i.e., the roll cover. With such materials, however, problems can occur.

A major problem is the effect that the polydiorganosiloxane release oils can have on the fusing roll. Although such oils aid in preventing toner build-up on the roll, they cause another problem because they are compatible with silicone polymers such as polydimethylsiloxane elastomers that are widely used as fusing roll covers. The polydimethylsiloxane oils are absorbed by the polydimethylsiloxane elastomer layers in the rolls upon repeated use and cause swelling of the rolls.

Because of the swelling of the rolls, defects appear in thermally fixed images. In particular, "step patterns" appear in the images when varying copy sheet sizes are used. These result from the differential swelling of the fusing roll inside and outside of the paper path, which causes non-uniform roll compression when different sizes of copy paper are used. There can also be increased wear on the roll and shortened useful fusing roll life because of softening of the roll surface and degrading interaction of polydimethylsiloxane oil with the core of the roll or with adhesive interlayers. The swelling problem has been controlled in fusing rolls by using fluoroelastomers that are resistant to absorption of the polydiorganosiloxane release oil. For example, U.S. Pat. No. 4,430,406, issued Feb. 7, 1984, discloses that the swell problem is controlled by overcoating a polydiorganosiloxane elastomer layer with a layer comprising a fluoroelastomer such as a crosslinked fluorosilicone elastomer or a fluoropolymer based elastomer, e.g., a vinylidene fluoride-based elastomer containing hexafluoropropylene as comonomer. The patent points out that such a fluoroelastomer layer is substantially more resistant to polydiorganosiloxane release oil absorption and, therefore, substantially decreases the forming of "steps" in an underlying polydiorganosiloxane elastomer layer. Examples of the use of crosslinked fluoroelastomers in outer layers or fusing roll covers that are not subject to the aforementioned swell problem and are adhesive to electrostatographic toners include U.S. Pat. No. 4,199,626, issued Apr. 22, 1980; U.S. Pat. No. 4,264,181, issued Apr. 28, 1981 and U.S. Pat. No. 4,272,179, issued Jun. 9. 1981.

Although crosslinked fluoroelastomers are effective to control the swelling problem in electrostatographic fusing members, such fluoroelastomers often exhibit lower than desirable thermal conductivity, which leads to inefficient heating of the toner to be fused. The addition of thermally conducting fillers such as aluminum oxide to prior art crosslinked fluoroelastomers to improve the thermal conductivity of fuser members containing them is often ineffective. Thus, the concentration of fillers needed for adequate thermal conductivity can detrimentally affect other properties of the fuser roll. For example, the rolls lose compliancy and increase in hardness which can result in inadequate fusing of the toner and undesirable toner offset. Also, if the fusing member is internally heated such as an internally heated roll, insufficient thermal conductivity can require the use of high temperatures that can cause thermal degradation, especially at the interface of the fuser roll core and an adjacent fluoroelastomer or polydiorganosiloxane elastomer layer.

It would be desirable to fabricate a fusing member that provides the benefits of a fusing member comprising a crosslinked fluoroelastomer and also exhibits a combination of properties, particularly thermal conductivity and thermal stability that is superior to prior art fusing members comprising crosslinked fluoroelastomers. An objective of this invention is to provide such a fusing member and, in addition, a fusing device employing such a fusing member.

SUMMARY OF THE INVENTION

This invention provides an electrostatographic fusing member useful for fusing heat-softenable toner material to a substrate. Thus, the invention provides an electrostatographic fusing member having a support and a layer comprising a crosslinked fluoroelastomer, wherein the fluoroelastomer is a crosslinked polyfluorophosphazene elastomer (sometimes referred to hereinafter simply as crosslinked PFP elastomer).

This invention also provides a device for fusing electrostatographic toner to a substrate by applying heat and pressure. The device comprises a first member for pressure contacting and heating the toner and a second member for maintaining the substrate and toner in contact with the first member, wherein the first member is an electrostatographic fusing member as described in the preceding paragraph.

In light of relevant prior art teachings, it is surprising that the crosslinked PFP elastomers employed in the practice of this invention are useful materials for electrostatographic fusing members. Thus, F. Bjork and B. Stenberg, in an article entitled "Comparison of Mechanical and Thermal Properties of Phosphonitrilic Fluoroelastomer and Fluorosilicone Rubber", *Plastics and Rubber Processing and Applications*, Vol. 9, No. 4, 1988, pp. 227-232, reports some mechanical and thermal properties of Eypel ™ F 7003 (manufactured and sold ready compounded with a silica filler by Ethyl Corporation, Baton Rouge, La.) which is described on page 228 as being a crosslinked polyfluorophosphazene elastomer having the structure:

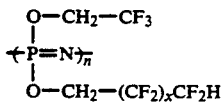

where $x = 1, 3, 5, 7 \ldots$

The authors' investigations show that the tensile strength of such an elastomer is strongly and adversely affected at a temperature of 180° C. and the article indicates, particularly in FIGS. 5 and 6 on page 231, that the stress relaxation of such an elastomer is significantly affected by changes in temperature. Considering the fact that the surface and/or internal temperatures of electrostatographic fusing members often exceed 180° C. and that significant variations in physical properties of electrostatographic fusing members with changes in temperatures are normally considered detrimental; it is quite unexpected that crosslinked polyfluorophosphazene elastomers are useful in electrostatographic fusing members according to this invention. For example, a material that undergoes a significant amount of stress relaxation can form step patterns of the type described previously herein.

An article by G. J. Knight and W. W. Wright entitled "Thermal Stability of Some Heat-Resistant Elastomers", *British Polymer Journal*, 21 (1989) pages 199-204, reports the results of a study comparing the thermal stabilities of several fluoroelastomer compositions, mainly in the vulcanized (crosslinked) state with polyfluorophosphazene elastomer compositions. Examples of the crosslinked fluoroelastomers that were evaluated include, a copolymer of vinylidene fluoride and hexafluoropropylene, a copolymer of tetrafluoroethylene and propylene and a terpolymer of tetrafluoroethylene, perfluoromethylvinylether + a third monomer. In each instance such crosslinked fluoroelastomers exhibited superior thermal stability to the crosslinked polyfluorophosphazene elastomers. Such results suggest that it would not be advantageous, and probably would be disadvantageous, to replace prior art crosslinked fluoroelastomers with crosslinked polyfluorophosphazene elastomers in fusing members where thermal stability is a significant factor.

Upon consideration of prior art teachings of the type provided by the aforementioned Bjork et al. and Knight et al. articles, it is believed that the selection of a crosslinked polyfluorophosphazene elastomer for use in fusing members and in fusing devices according to the practice of this invention is unobvious and, therefore, patentable. However, it is also significant to note that crosslinked polyfluorophosphazene elastomers are able to tolerate sufficiently high concentrations of thermally conducting fillers to achieve adequate thermal conductivity for fusing members comprising such crosslinked polyfluorophosphazene elastomers without significantly deleteriously affecting other desirable properties of the fusing members, for example, compliancy, hardness and fuser member life. Thus, a significant feature of this invention, as illustrated by the following Example 2, is the use of thermally conducting fillers such as aluminum oxide at effective concentrations that provide the crosslinked polyfluorophosphazene elastomers with the desired thermal conductivity without undesirably affecting the physical properties of fusing members containing such elastomers.

DESCRIPTION OF PREFERRED EMBODIMENTS

The fluoroelastomers that are used in the practice of this invention are fluorine-containing elastomeric polymers that are crosslinked, sometimes referred to as cured or vulcanized. They are typically amorphous or semicrystalline materials, normally having a glass transition temperature ($T_g$) below about 0° C., often in the range of about $-25°$ C. to $-80°$ C. Such fluoroelastomers are characterized by a polymer backbone having repeating

units wherein the phosphorus atoms are bonded to fluorine-containing organic radicals such as fluoroalkoxy or fluoroaryloxy radicals, often distributed in random fashion along the polymer backbone. Typically, the fluoroelastomers employed in the practice of this invention comprise about 20 to 100,000, often about 100 to 50,000 repeating units. These fluoroelastomers can be prepared from non-crosslinked PFP elastomer base polymers that contain a minor portion, for example, up to 10 mole percent of crosslinkable substituents on the phosphorus atoms, using procedures that are well known to those skilled in the art, as described for example, in U.S. Pat. No. 3,515,688, issued Jun. 2, 1970; U.S. Pat. No. 3,702,833, issued Nov. 14, 1972; U.S. Pat. No. 3,970,533, issued Jul. 20, 1976; and U.S. Pat. No. 4,734,471, issued Mar. 29, 1988.

In a typical preparation a substantially linear, non-crosslinked PFP elastomer base polymer containing curing sites such as olefinically unsaturated radicals is subjected to curing, e.g., a sulfur accelerated cure, a radiation cure, contact with an effective amount of a peroxide curing agent or, as in U.S. Pat. No. 4,734,741, a "catalytic amount" of a platinum halide, haloplatinic acid or hydrate thereof to achieve the desired crosslinking. The base polymers can be made by first making polychlorophosphazene by the thermal polymerization of purified cyclic PNCl₂ trimer at approximately 200°-250° C. Various materials, e.g., Lewis Acids such as BCl₃ and AlCl₃ are often used to catalyze the polymerization. The resulting chloropolymer is then substituted by reaction with at least one reactive organo compound which contains a reactive hydrogen atom. This is generally conducted in the presence of a tertiary amine to react with the HCl which is split off. Alternatively, the reactive organo compound can be reacted with an alkali metal such as sodium to replace the reactive hydrogen atom with sodium and the sodium derivative reacted with the chloropolymer. For example, sodium alkoxides and aryloxides react readily with chloropolymer to yield alkoxide and/or aryloxide substituted non-crosslinked PFP elastomer base polymer.

Common substituents on the phosphorus atoms in the non-crosslinked PFP elastomer base polymers that are carried over into the crosslinked PFP elastomers employed in this invention are alkoxides and aryloxides, at least some of which contain fluorine atoms. Representative substituent groups are 2,2,2-trifluoroethoxy, 2,2,3,3-tetrafluoro-1-propoxy, 2,2,3,3,3-pentafluoropropoxy, 2,2,3,3,4,4,4-n-heptafluorobutoxy, 2,2,3,3,4,4,5,5- octafluoropentoxy, 4-fluorophenoxy, perfluoro-octanoxy, 2,2,3,3,4,4,5,5,6,6,7,7-dodecafluoroheptanoxy and 4-(trifluoro- methyl)phenoxy. In one embodiment, the substituent groups comprise a major amount of fluoroalkoxy groups, for example, fluoroalkoxy groups having the formula

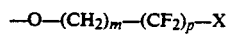

$$-O-(CH_2)_m-(CF_2)_p-X$$

wherein m is an integer from 1 to 3, p is an integer from 1 to 20 and x is hydrogen or fluorine. In a preferred embodiment, m is 1 and p is an integer from about 1 to 10. The fluoroalkoxy substituents can be mixtures of different fluoroalkoxy groups wherein m and/or p have several values in the various substituents. Often, m will be 1 and p will be 1 in a portion of the groups and a mixture of different integers in the range of about 2-10 in the remaining fluoroalkoxy groups.

The non-crosslinked PFP elastomer base polymers are typically substituted with at least some olefinically unsaturated groups. Such groups have an olefinic double bond in their structure which is capable of further reaction to form the desired crosslinks by vinyl addition polymerization. Examples of such unsaturated groups are alkenyloxy such as allyloxy, butenyloxy, pentenyloxy and hexenyloxy, fluoroalkenyloxy such as 2,3,3-fluoropropenyloxy, alkenylaryloxy such as o-allylphenoxy, m-allylphenoxy, p-allylphenoxy, 4-(but-3-enyl)phenoxy, 2-methoxy- 4-allylphenoxy, 2-methoxy-4-propenylphenoxy and 2-methyl-4-allylphenoxy. The amount of the unsaturated substituents usually does not exceed 25 mole percent, and is generally in the range of about 0.1 to 5 percent, based on total substituent groups in the base polymer. The major substituents on the phosphorus atoms in the base polymers and, of course, the resulting crosslinked PFP elastomers are, of course, fluorine-containing groups such as fluoroalkoxy groups which comprise at least 60 mole percent, typically at least 90 mole percent of all substituents on the phosphorus atoms. Other substituents that contain no fluorine and no olefinic unsaturation and do not interfere with the fusing properties of the crosslinked PFP elastomer can also be present in varying amounts, for example, up to about 40 mole percent, normally about 0 to 10 mole percent. Such remaining substituents, if any, include for example, alkyl groups such as ethyl, methyl, hexyl and decyl, alkoxy groups such as methoxy, ethoxy, butoxy, hexoxy, decyloxy, dodecyloxy, and eicosyloxy, polyalkoxy groups, i.e., poly(alkeneoxy) such as methoxyethoxy, methoxyethoxyethoxy, methoxypenta- (ethyleneoxy) and methoxydeca(ethyleneoxy), alkylthio and poly(alkylthio) groups such as methylthio and methylthioethylthio, aryloxy groups such as phenoxy, p-methylphenoxy, o-methylphenoxy, p-ethylphenoxy, p-butylphenoxy p-methoxyphenoxy, p-ethoxyphenoxy, o-ethoxyphenoxy, and p-butoxyphenoxy. Such remaining substituents can contain groups that are known to improve toner release, for example, siloxy and silyl groups.

In the fusing members of this invention, the layer comprising the crosslinked PFP elastomer can be a layer that forms the outer surface of the fusing member or it can be an intermediate layer that forms a part of a composite fusing layer. Such layers vary in thickness but they are generally about 0.02 to 2.5 mm, often about 1 to 1.5 mm thick. In one embodiment, the layer comprising the crosslinked PFP elastomer is an outer layer that forms a surface that is adhesive to an electrostatographic toner fusing material. In another embodiment, the layer containing the crosslinked polyfluorophosphazene elastomer is used as a barrier layer to minimize absorption of polydimethylsiloxane release oil by a layer comprising a silicone elastomer. In such embodiment the fusing member comprises a layer containing a silicone elastomer between the support for the fusing member and a layer comprising the crosslinked PFP elastomer. In order to increase the release characteristics of such a fusing member, it may be appropriate to provide a thin layer over the layer containing the crosslinked PFP elastomer as described in U.S. Pat. No. 4,430,406, previously discussed herein. Elastomers that can be used to form layers in the fusing members of this invention, in addition to layers containing the crosslinked PFP elastomers are heat stable elastomers that withstand the temperatures used in fusing electrostatographic toners. Such materials are well known and are extensively described in the prior art, including, e.g., the aforementioned U.S. Pat. No. 4,430,406 and U.S. Pat. No. 4,264,181, issued Apr. 28, 1981. Examples of such elastomers include fluoro-silicone elastomers, the silicone carborane elastomers, various other silicone rubbers, fluoroelastomers, vinylidene fluoride-based elastomers, various organic rubbers such as ethylene/propylene diene, fortified organic rubbers which resist degradation at fusing temperatures and various copolymers, block copolymers, copolymer and elastomer blends. Organic rubbers which resist degradation at the operating temperature of the fusing member can be used. These include chloroprene rubber, nitrile rubber, chlorobutyl rubber, ethylene propylene terpolymer rubber (EPDM), butadiene rubber, ethylene propylene rubber, butyl rubber, butadiene/acrylo- nitrile rubber, ethylene acrylic rubber and styrene/butadiene rubber.

As indicated hereinbefore, the fusing members of this invention can comprise one component of a device for fusing electrostatographic toner to a substrate by applying heat and pressure. The fusion step commonly consists of passing the substrate, such as a sheet of paper on which toner particles are distributed in an image pattern, through the nip of a pair of rolls. One roll is a fusing roll which pressure contacts and heats the toner particles while the other roll maintains the substrate and toner particles in contact with the fusing roll. This other roll may also be heated. The heated fusing roll has a surface that is relatively resilient in comparison to the surface of the other roll. Some resilience is desirable so that the roll will deform somewhat under pressure and create a significant area of contact with the other roll at the nip. In this way the residence time of toner in the heated nip is sufficient to fuse it to the paper.

Fusing members having a layer comprising a crosslinked fluoroelastomer and fusing devices employing such fusing members as one component are well known in the art of electrostatography. Therefore, a detailed redescription of such fusing members and devices and their preparation and use is not necessary and will not be presented herein. For a detailed description of such fusing members and devices and their preparation and use see, for example, U.S. Pat. No. 4,199,626, issued Apr. 22, 1980; U.S. Pat. No. 4,264,181, issued Apr. 28, 1981; U.S. Pat. No. 4,272,179, issued Jun. 9, 1981; and U.S. Pat. No. 4,430,406, issued Feb. 7, 1984, the disclosures of which are hereby incorporated herein by reference. The significant difference between such well-known fusing members and fusing devices employing those fusing members and the fusing members and fusing devices of the present invention is the present use of fusing members having a layer comprising a crosslinked PFP elastomer as described herein.

Although a detailed description of many features common to fusing members and fusing devices of this invention and those of the prior art may not be absolutely necessary to understand this invention, a general description of some embodiments of the present invention are presented hereinafter to aid in understanding certain important features.

The layers containing crosslinked PFP elastomers in the fusing members of the invention can contain one or more addenda such as fillers and release agents. Examples of useful fillers include aluminum oxide, fumed silica, precipitated silica, calcium carbonate and ferric oxide. Fillers such as silica or calcium carbonate can be used in a concentration from about 1 to 20 weight percent of the layer to improve physical strength. As previously indicated herein, the thermally conducting fillers are very effective addenda in the crosslinked polyfluorophosphazene layers used in the fusing members of this invention. Such thermally conducting fillers are used in an effective concentration which provides adequate thermal conductivity without deleteriously effecting the physical properties of the fusing member. In general, such effective concentration is sufficient to provide a thermal conductivity of at least about 0.5 W/m°C., often a thermal conductivity in the range of about 0.60 to about 0.8 W/m°C. Aluminum oxide in a concentration from about 60 to 75 weight percent of the layer is particularly effective in high speed operations for improving thermal conductivity of the layer, although other fillers that improve such thermal conductivity include, zinc oxide, magnesium oxide, carbon, iron oxide and metal fibers. Such thermally conducting fillers are particularly desirable when the fusing member is to be internally heated during toner fusing. Ferric oxide in amounts from about 1 to 10 weight percent also serve as a thermal stabilizer for the crosslinked PFP elastomer. Aluminum oxide and ferric oxide also strengthen the polymer and, therefore, when they are used, other strengthening or reinforcing fillers such as silica and calcium carbonate can be eliminated or used in lower concentrations.

Release agents are substances which further reduce the adhesion of toner to a fusing member surface and can, if desired, be blended with the crosslinked PFP elastomer in minor concentrations, e.g., 5 to 25 weight percent. Examples include poly(tetrafluoroethylene), boron nitride and fluorinated graphite.

The fusing members of this invention can be used with conventional release agents (oils or fluids) that are normally applied to the active surface of a fusing member to enhance toner release. Such materials include, for example, silicone fluids of both low and high viscosity poly(dimethylsiloxane) oils.

Fusing members of this invention comprise a support, preferably a cylindrical core, coated with one or more layers comprising crosslinked PFP elastomer. The preferred fusing member is in the form of a roll, although suitable fusing members can be in the form of plates, continuous belts and the like. A suitable support for the fusing member comprises any rigid metal or plastic substance such as aluminum, steel and various alloys and polymeric materials such as thermoset resins, with or without fiber reinforcement.

In one embodiment of this invention, a fusing member is fabricated by first preparing a mixture to be used to form the layer comprising crosslinked PFP elastomer. The mixture comprises the uncrosslinked base polymer of choice, any other polymers and other addenda, such as inorganic fillers and release agents, desired to be included in the layer and a curing agent or catalyst useful for crosslinking of the base polymer. Such curing agents and catalysts are known and include sulfur, peroxide curing agents such as dicumyl peroxide, benzoyl peroxide, and 2,5-dimethyl-2,5-di(butylperoxy)hexane and platinum catalysts of the type described in U.S. Pat. No. 4,734,471, discussed previously.

The ingredients of the mixture are blended together by any convenient means, for example, by milling all the ingredients together on a two-roll mill.

A layer of the mixture, e.g., in sheet form of 0.5 to 2.5 mm thickness, is then placed on a support of choice, e.g., a cylindrical core, and molded to the support by any convenient means, but preferably by known techniques of compression molding using heat and pressure, with the heat being sufficient to cause at least some crosslinking of the uncrosslinked base polymer.

The member is then cooled, removed from the molding apparatus, and subjected to a further heat treatment sufficient to complete the crosslinking and drive any volatile materials out of the layer of crosslinked PFP elastomer.

If desired, the fusing member can then be ground down to a desired thickness, or in the case of a fusing roll, to a desired diameter by any known technique.

Fusing members produced in accordance with the invention have been used as fusing rolls and have been otherwise tested to determine various physical properties thereof. When used as fusing rolls, with application of heat and polydiorganosiloxane release liquids thereto, the rolls have exhibited good fusing performance. Their superior resistance to swelling by the release liquids has resulted in reduction or elimination of step patterns. Their hardness, resilience, compressibility, tensile strength are acceptable and they exhibit a combination of resistance to thermal degradation and thermal conductivity that is superior to fusing rolls prepared with prior art fluoroelastomers.

The fusing members of this invention are used for fusing heat-softenable toner materials of the type that are well known and have the physical properties required in dry electrostatographic toner materials. Such toner materials or particles can be thermally fixed or adhered to a receiving sheet such as paper or plastic. These thermal fixing techniques are well known in the art.

Many polymers have been reported in the literature as being useful in dry electrostatographic toners. Polymers useful in such toners include vinyl polymers, such as homopolymers and copolymers of styrene and condensation polymers such as polyesters and copolyesters. Fusible styrene-acrylic copolymers which are covalently lightly crosslinked with a divinyl compound such as divinylbenzene, as disclosed in the patent to Jadwin et al, U.S. Re 31,072, are useful. Also useful are polyesters of aromatic dicarboxylic acids with one or more aliphatic diols, such as polyesters of isophthalic or terephthalic acid with diols such as ethylene glycol, cyclohexane dimethanol and bisphenols. Examples are disclosed in the patent to Jadwin et al.

Fusible toner particles used in this invention can have fusing temperatures in the range from about 50° C. to 200° C. so they can readily be fused to paper receiving sheets. Preferred toners fuse in the range of from about 65° C. to 120° C. If the toner transfer is made to receiving sheets which can withstand higher temperatures, polymers of higher fusing temperatures can be used.

Useful toner particles can simply comprise the polymeric particles but, it is often desirable to incorporate addenda in the toner such as waxes, colorants, release agents, change control agents, and other toner addenda well known in the art.

If a colorless image is desired, it is not necessary to add colorant to the toner particles. However, more usually a visibly colored image is desired and suitable colorants selected from a wide variety of dyes and pigments such as disclosed for example, in U.S. Reissue Pat. No. 31,072 are used. A particularly useful colorant for toners to be used in black-and-white electrophotographic copying machines is carbon black. Colorants in the amount of about 1 to about 30 percent, by weight, based on the weight of the toner can be used. Often about 1 to 8 percent, by weight, of colorant is employed.

Charge control agents suitable for use in toners are disclosed for example in U.S. Pat. Nos. 3,893,935; 4,079,014; 4,323,634 and British Patent Nos. 1,501,065 and 1,420,839. Charge control agents are generally employed in small quantities such as, about 0.1 to 3, weight percent, often about 0.2 to 1.5 weight percent, based on the weight of the toner.

Toners used with fusing members of this invention can be mixed with a carrier vehicle. The carrier vehicles, which can be used to form suitable developer compositions, can be selected from a variety of materials. Such materials include carrier core particles and core particles overcoated with a thin layer of film-forming resin. Examples of suitable resins are described in U.S. Pat. Nos. 3,547,822; 3,632,512; 3,795,618; 3,898,170; 4,545,060; 4,478,925; 4,076,857; and 3,970,571.

The carrier core particles can comprise conductive, non-conductive, magnetic, or non-magnetic materials. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See for example, U.S. Pat. Nos. 4,042,518; 4,478,925; and 4,546,060.

A typical developer composition containing toner particles and carrier vehicle generally comprises about 1 to 20 percent, by weight, of particulate toner particles and from 80 to 99 percent, by weight, carrier particles. Usually, the carrier particles are larger than the toner particles. Conventional carrier particles have a particle size on the order of about 20 to 1200 micrometers, generally about 30 to 300 micrometers. Alternatively, the toners can be used in a single component developer, i.e., with no carrier particles.

Typical toner particles generally have an average diameter in the range of about 0.1 to 100 μm, a diameter of about 2 to 20 μm being particularly useful in many current copy machines.

The following Examples are included to further illustrate the invention and particularly the preparation and superior properties of fusing members made in accordance with this invention. Parts and percentages are by weight unless otherwise specified.

EXAMPLE 1

Base Polymer Formulation

A mixture of 38 parts of a polyfluorophosphazene (available from Ethyl Corporation, Baton Rouge La. as Eypel ™ F Polyphosphazene Gum and described in U.S. Pat. No. 4,734,471, Example 1 as containing 64.6 mole % trifluoroethyoxy groups, 35 mole percent mixed $C_{3-11}$ fluoroalkoxy groups and 0.4 mole percent o-allylphenoxy groups), 52 parts of aluminum oxide, 10 parts ferric oxide and 0.5 percent of a peroxide curing agent was passed through a 2-roll mill at 18° C. for 10 minutes to form a sheet.

Roll Formation

A cylindrical aluminum core was cleaned, washed to remove contaminants and coated with a conventional silicone priming agent. A sheet of the polymer composition prepared according to the Base Polymer Formulation procedure was compression molded to the primed core at 175° C. and 4.1 MPa for 30 minutes and then the roll was removed from the molding apparatus and the polymer cover fully cured at one hour ramp to 175° C., 3 hours at 175° C., 1 hour ramp to 200° C. and 2 hours at 200° C. The roll cover was ground down to a thickness of approximately 1.25 mm.

Roll Performance

The fusing roll was used in the fuser assembly of an Ektaprint 150 Copier ™ (manufactured by Eastman Kodak Co., Rochester, N.Y.) at a fusing roll temperature of 177° C. to fix an image of dry toner particles comprising styrene copolymer binder, colorant and charge agent. Approximately 5,000 copies were fused with no evidence of hot offset which illustrates the excellent offset resistance of the crosslinked PFP elastomer.

Testing

A sample of the roll cover having a thickness of approximately 1.8 mm prepared with the crosslinked PFP elastomer was measured for thermal conductivity at 175° C. using a C-matic Model TCHM-LT Thermal Conductivity Instrument from Dynatech R/D Co., Cambridge, Mass., U.S.A. Results are given in watts per meter degree Celsius (W/m°C.) in the following Table 1. The sample was also weighed and tested for Shore A hardness (Test D-2240-81 of the American Society of Testing Materials). The sample was then immersed in poly(dimethylsiloxane) release oil at 177° C. for one week, and each sample was then weighed and tested for hardness after immersion. The percent change in weight after immersion indicates the degree of swelling. The following Table 1 reports results of immersion of the roll cover in a low viscosity poly(dimethylsiloxane) oil (350 centistokes). As indicated in the Table, swelling which would be evidenced by weight increase, does not occur in the roll cover. Also, Shore A hardness remains nearly the same before and after immersion in the oil which indicates that there is no detrimental softening of the roll surface which could lead to a shortened fusing life. As indicated in the Table, the thermal conductivity of the cover is excellent. In addition, the roll cover was tested for thermal stability by storing a sample having a thickness of 1.3 cm and a diameter of 5.1 cm at 175° C. in an oven. After 5 weeks the sample experienced a weight loss of only 0.94 percent which illustrates its excellent thermal stability.

TABLE 1*

| Thermal Conductivity (W/m° C.) | Immersion in Release Oil | | | | | |
|---|---|---|---|---|---|---|
| | Shore A Hardness | | | Cover Weight (g) | | |
| | Before Immersion | After Immersion | Δ Shore A | Before Immersion | After Immersion | % Δ |
| 0.52 | 82 | 84 | 2 | 2.047 | 2.040 | −0.33 |

*All data are the averages of triplicate samples tested.

For comparison purposes, a sample of a comparable roll cover prepared using a prior art crosslinked polydimethylsiloxane elastomer, available from the Emerson Cumming, Inc., Woburn, Mass., as formula No. EC 4952, was tested for degree of swelling according to the procedure of this Example. The %Δ increase in weight was 9.12. A comparison of this value with the corresponding %Δ reported in the Table for the roll cover of this invention illustrates that fusing roll covers prepared from the crosslinked PFP elastomers according to this invention exhibit superior resistance to swelling by release oils in comparison to prior art roll covers prepared from comparable prior art crosslinked polydimethylsiloxane elastomers.

EXAMPLE 2

As previously indicated herein, the crosslinked polyfluorophosphazene elastomer layers used in the fuser members of this invention tolerate sufficient concentrations of thermally conducting fillers to achieve adequate thermal conductivity without deleteriously affecting polymer properties, e.g. hardness. To illustrate this feature of the invention, fuser member roll cover samples were prepared according to the procedure of Example 1 and tested for Shore A hardness according to test D-2240-81 of the American Society of Testing Materials. As prescribed in such test, the samples used were approximately 6.35 mm thick to provide a meaningful comparison between the hardness of the different materials tested. Comparable samples comprised a layer of the crosslinked polyfluorophosphazene elastomer described in Example 1 containing aluminum oxide at concentrations of 50 and 60 weight %. (Samples A and B, respectively). A comparable sample (Sample C) comprised a layer of a crosslinked terpolymer of vinylidine fluoride, hexafluoropropylene and tetrafluoroethylene (commercially available as Viton B from E.I. duPont de Nemours and Company, Wilmington, Del.) containing aluminum oxide at a concentration of 45 weight % (Sample C). The results of the hardness measurements are set forth in the following Table 2:

TABLE 2*

| Sample | Thermal Conductivity W/m° C. | Shore A Hardness |
|---|---|---|
| A | 0.47 | 69 |
| B | 0.59 | 76 |
| C | 0.47 | 82 |

*All data are the averages of triplicate samples tested.

Useful internally heated fuser rolls require a thermal conductivity for samples of the type described in Table 2 above to be approximately 0.5 W/m°C. or more with a Shore A hardness of 78 or less. As shown by the results reported in Table 2, the Sample C fuser member (prior art crosslinked fluoroelastomer) exhibits insufficient thermal conductivity at a concentration of aluminum oxide filler (45 weight %) where the crosslinked fluoroelastomer layer is already too hard for adequate fusing of a toner and adequate resistance to toner offset. In contrast, the values reported for Sample A in Table 2 illustrate that the same thermal conductivity as obtained in Sample C is obtained at a concentration of 50 weight percent aluminum oxide filler while achieving much lower hardness. In addition, the values reported for Sample B clearly demonstrates that the fuser members of this invention are capable of achieving excellent thermal conductivity (0.59 W/m°C.) combined with acceptable hardness (Shore A 76).

Although the invention has been described in detail with particular reference to certain preferred embodiments thereof, it should be appreciated that variations and modifications can be effected within the spirit and scope of the invention.

We claim:

1. In an electrostatographic toner fusing member having a support and a layer comprising thermally conducting filler particles and a crosslinked fluoroelastomer, the improvement wherein said fluoroelastomer is a crosslinked polyfluorophosphazene elastomer.

2. The fusing member of claim 1, wherein said layer forms the outer surface of the fusing member.

3. The fusing member of claim 1, having a layer comprising a silicone elastomer between said support and said polyfluorophosphazene elastomer layer.

4. The fusing member of claim 1, wherein said support is a cylindrical core.

5. The fusing member of claim 1, wherein said polyfluorophosphazene elastomer is a crosslinked polyfluorophosphazene elastomer comprising fluoroalkoxy substituents on the phosphorus atoms that form the polymer backbone.

6. The fusing member of claim 1, wherein said filler particles are present in a concentration sufficient to provide a thermal conductivity of at least about 0.5 W/m°C.

7. The fusing member of claim 6, wherein the filler particles are aluminum oxide and iron oxide particles.

8. In a device for fusing electrostatographic toner to a substrate by applying heat and pressure, said device comprising a first member for pressure contacting and heating said toner and a second member for maintaining said substrate and toner in contact with said first member, the improvement wherein said first member is the fusing member of claim 1.

9. The device of claim 8, wherein said first and second members are rolls that form a nip for receiving said substrate.

10. The device of claim 8 wherein said filler particles are present in a concentration sufficient to provide a thermal conductivity of at least about 0.5 W/m°C.

* * * * *